United States Patent
Miyamae

(10) Patent No.: US 9,960,680 B1
(45) Date of Patent: May 1, 2018

(54) CONTROL APPARATUS, SWITCHING POWER SUPPLY AND CONTROL METHOD FOR MAINTAINING POWER CONVERSION EFFICIENCY

(71) Applicant: Cypress Semiconductor Corporation, San Jose, CA (US)

(72) Inventor: Toru Miyamae, Aichi (JP)

(73) Assignee: Cypress Semiconductor Corporation, San Jose, CA (US)

(*) Notice: Subject to any disclaimer, the term of this patent is extended or adjusted under 35 U.S.C. 154(b) by 0 days. days.

(21) Appl. No.: 15/204,839

(22) Filed: Jul. 7, 2016

Related U.S. Application Data

(63) Continuation of application No. 14/448,442, filed on Jul. 31, 2014, now Pat. No. 9,391,512.

(51) Int. Cl.
| | |
|---|---|
| *H02M 3/156* | (2006.01) |
| *H02M 3/158* | (2006.01) |
| *H02M 1/14* | (2006.01) |
| *H02M 1/08* | (2006.01) |
| H02M 1/00 | (2006.01) |

(52) U.S. Cl.
CPC ............ *H02M 3/158* (2013.01); *H02M 1/08* (2013.01); *H02M 1/14* (2013.01); *H02M 3/156* (2013.01); *H02M 2001/0009* (2013.01); *H02M 2001/0025* (2013.01)

(58) Field of Classification Search
CPC ......... H02M 3/156; H02M 2001/0009; H02M 2001/0025
See application file for complete search history.

(56) References Cited

U.S. PATENT DOCUMENTS

| 7,221,134 B1* | 5/2007 | Ling | H02M 3/156 |
| | | | 323/284 |
| 2007/0236971 A1* | 10/2007 | Chen | H02M 3/1588 |
| | | | 363/56.01 |
| 2008/0211473 A1* | 9/2008 | Tlaskal | H02M 1/38 |
| | | | 323/283 |
| 2011/0127981 A1* | 6/2011 | Miyamae | H02M 3/156 |
| | | | 323/282 |
| 2011/0291623 A1* | 12/2011 | Granat | H02M 3/156 |
| | | | 323/271 |
| 2012/0105031 A1* | 5/2012 | Kumagai | H02M 3/156 |
| | | | 323/271 |
| 2012/0217941 A1* | 8/2012 | Chen | H02M 3/156 |
| | | | 323/271 |

(Continued)

OTHER PUBLICATIONS

USPTO Non-Final Rejection for U.S. Appl. No. 14/448,442 dated Sep. 30, 2015; 7 pages.

(Continued)

*Primary Examiner* — Jue Zhang
*Assistant Examiner* — Lakaisha Jackson

(57) ABSTRACT

Disclosed herein are an apparatus for controlling a switch-mode power supply, and a method of operating the same. In an embodiment, it is determined whether or not a current of an inductor of the switching power supply has become less than or equal to a predetermined value. In an embodiment, a variable reference voltage is adjusted based on the current of the inductor and an output voltage. In an embodiment, a switch is turned off based on the inductor current, the output voltage, and the variable reference voltage.

20 Claims, 10 Drawing Sheets

(56) References Cited

U.S. PATENT DOCUMENTS

| | | | | |
|---|---|---|---|---|
| 2014/0002047 A1* | 1/2014 | Houston | ............... | H02M 3/156 323/283 |
| 2014/0097808 A1* | 4/2014 | Clark | ....................... | G05F 1/70 323/208 |
| 2014/0139198 A1* | 5/2014 | Manlove | ............... | H02M 3/156 323/282 |
| 2014/0312870 A1* | 10/2014 | Imayoshi | .............. | H02M 3/156 323/284 |

OTHER PUBLICATIONS

USPTO Notice of Allowance for U.S. Appl. No. 14/448,442 dated Mar. 15, 2016; 8 pages.

\* cited by examiner

CONTROL APPARATUS, SWITCHING POWER SUPPLY AND CONTROL METHOD FOR MAINTAINING POWER CONVERSION EFFICIENCY

CROSS-REFERENCE TO RELATED APPLICATION

This application is a Continuation of U.S. patent application Ser. No. 14/448,442, filed Jul. 31, 2014, which is incorporated by reference herein in its entirety.

BACKGROUND

DC-to-DC converters with high power conversion efficiency are widely used in typical switching power supplies. The DC-to-DC converter is generally configured to drive a switch by a pulse width modulation ("PWM") method that performs switching at a predetermined switching frequency to prevent current flowing in an inductor from becoming 0 A. This may enhance power conversion efficiency when current continuously flows in a continuous current mode ("CCM").

However, when a light load such as a device, a circuit or the like is connected to the output of the DC-to-DC converter and supplied with power, the current flowing in the inductor may be 0 A, i,e., a discontinuous current mode ("DCM"), during a partial period of a switching cycle of the PWM method. In this case, since degradation of the power conversion efficiency due to a switching loss increases relatively, the switch is often driven by a pulse frequency modulation ("PFM") method capable of reducing the number of times of switching, A burst mode circuit automatically performs switching from a PWM method to a burst mode, such as the PFM method, as disclosed in U.S. Pat. No. 6,307,356, for example. In the burst mode circuit, switching by the PFM method is performed at a fixed duty ratio determined by an oscillator. However, when an input voltage is changed to a low state and the PWM method is set to be switched to the PFM method in a state in which the input voltage is high, for example, the PWM method is switched to the PFM method based on the value set in the high state of the input voltage, thereby causing degradation of power conversion efficiency in the low state of the input voltage. Further, power conversion efficiency is degraded in the same manner not only when the input voltage changes, but also when other conditions change, such as the output tage, the frequency for switching, the inductance of the inductor, etc.

SUMMARY

Provided herein are control apparatus, switching power supply, and control method embodiments, and/or combinations and sub-combinations thereof, for maintaining power conversion efficiency.

An embodiment includes a control apparatus for a switching power supply, comprising a pause controller configured to pause switching of the switching power supply based on a reference voltage, a current determination part configured to determine whether or not a current of an inductor of the switching power supply has become less than or equal to a predetermined value, and a reference voltage controller configured to control the reference voltage based on at least one of a result of determining by the current determination part or a result of comparing a voltage according to an output voltage of the switching power supply and the reference voltage.

Another embodiment includes a switching power supply corrrprising an output part comprising a switch and an inductor, and a control apparatus comprising a pause controller configured to pause switching of the switching powersupply based on a reference voltage, a current determination part configured to determine whether or not a current of the inductor of the switching power supply has becomeless than or equal to a predetermined value, and a reference voltage controller configured to control the reference voltage based on at least one of a result of determining by the current determination part or a result of comparing a voltage according to an output voltage of the switching power supply and the reference voltage.

A further embodiment includes a control method for a switching power supply comprising determining whether or not a current of aninductor of the switching power supply has become less than or equal to a predetermined value, controlling a reference voltage based on at least one of a result of the determining or a result of comparing a voltage according to an output voltage of the switching power supply and the reference voltage, and pausing switching of the switching power supply based on the reference voltage.

In the embodiments presented herein, the terms "part", "device" and "system" not only mean physical mechanisms, but also include realization of functions that the "part", "device" and "system" have, by software. The function that one "part", "device" or "system" has may be realized by two or more physical mechanisms or devices. Alternatively, the two or more functions of "part", "device" and "system" may be realized by one physical mechanism or device.

BRIEF DESCRIPTION OF THE DRAWINGS

The accompanying drawings are incorporated herein and form a part of the specification.

In the drawings, like reference numbers generally indicate identical or similar elements.

DETAILED DESCRIPTION

First Embodiment

Figure 1:
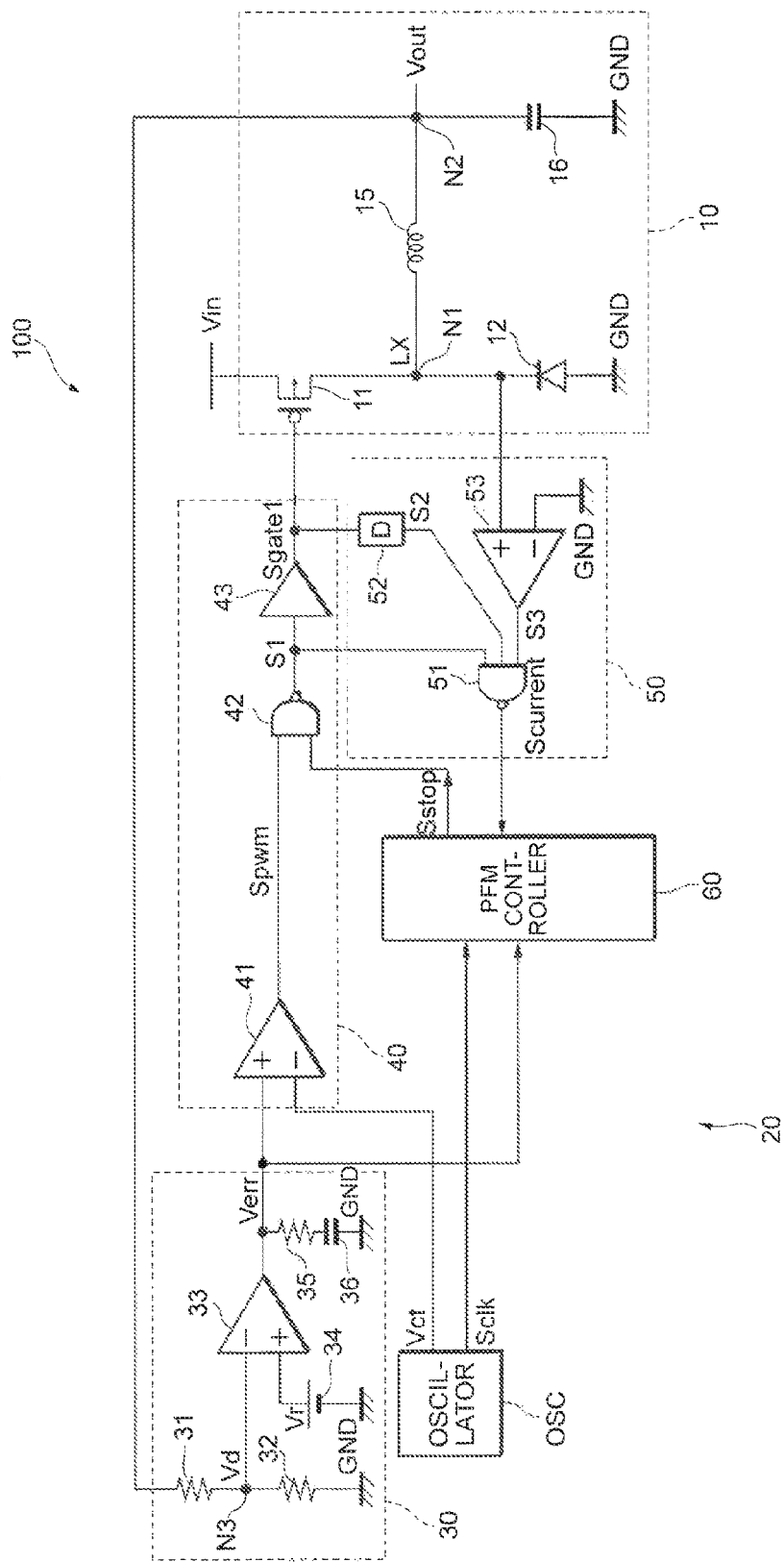
FIG. 1 is a circuit diagram illustrating an example switching power supply, according to an example embodiment.

FIGS. 1-7 are diagrams describing a first embodiment. FIG. 1 is a circuit diagram illustrating an example of a switching power supply 100 according to the first embodiment. The switching power supply 100 is, for example, a step-down DC-to-DC converter that lowers an input voltage Vin to generate an output voltage Vout (Vin>Vout). As shown in FIG. 1, the switching power supply 100 comprises an output part 10 and a control apparatus 20.

The output part 10 comprises switch 11, switch 12, inductor 15, and capacitor 16.

The switch 11 is, for example, a P channel MOSFET, which has drain supplied with the input voltage Vin and a source connected to a node N1. The switch 12 is, for example, a diode, which has an anode connected to the ground GND and a cathode connected to the node N1.

The inductor 15 has one end connected to the node N1 and the other end connected to a node N2. The capacitor 16 has one end connected to the node N2 and the other end connected to the ground GND.

A gate of the switch 11 is inputted with a drive signal Sgate1 front the control apparatus 20. The switch 11 is driven in response to the drive signal Sgate1 to conduct switching, i.e., be turned on and off. For example, when the drive signal Sgate1 is relatively low in level ("L level"), the switch 11 is turned on. When the drive signal Sgate1 is relatively high in level ("H level"), the switch 11 is turned off. By switching the switch 11 in response to the drive signal Sgate1 of the control apparatus 20 in this manner, energy is stored in the inductor 15 when the switch 11 is off, and a current flows in the inductor 15 when the switch 11 is on. Thus, the output part 10 outputs an output voltage Vout smoothed by the capacitor 16.

The control apparatus 20 comprises an error amplifier 30, a PWM controller 40, a current determination part 50 and a PFM controller 60.

The error amplifier 30 comprises resistors 31 and 32, an amplifier 33, a voltage source 34, a resistor 35 and a capacitor 36.

The resistor 31 has one end supplied with the output voltage Vout of the output part 10 and the other end connected to a node N3. The resistor 32 has one end connected to the node N3 and the other end connected to the ground GND.

The amplifier 33 has an inverting input terminal connected to the node N3 and a non-inverting input terminal supplied with a reference voltage Vr from the voltage source 34. The resistor 35 and the capacitor 36 are connected in series between an output terminal of the amplifier 33 and the ground GND. Further, the resistor 35 and the capacitor 36 are an example of a phase compensation circuit.

The resistor 31 and the resistor 32 generate a voltage Vd obtained by dividing the output voltage Vout at a division ratio corresponding to their resistance values. This voltage Vd is a voltage proportional to the output voltage Vout. The amplifier 33 amplifies the difference between the voltage Vd and the reference voltage Vr to output an error voltage Verr. This error voltage Verr becomes a voltage value corresponding to the output voltage Vout of the output part 10.

The PWM controller 40 is for switching the output part 10 by the PWM method. The PWM controller 40 comprises a comparator 41, a NAND circuit 42 and a buffer circuit 43.

The comparator 41 has a non-inverting input terminal supplied with the error voltage Verr of the error amplifier 30. An oscillator OSC outputs a triangle wave Vct of a prescribed cycle, e.g., a sawtooth wave. The triangle wave Vct of the oscillator OSC is supplied to an inverting input terminal of the comparator 41.

The comparator 41 compares the error voltage Verr and the triangle wave Vct and outputs a PWM signal Spwm corresponding to the result of comparison therebetween. For example, when the voltage of the triangle wave Vct is higher than the error voltage Verr, the comparator 41 outputs a PWM signal Spwm of an L level. When the voltage of the triangle wave Vct is not higher than the error voltage Verr, the comparator 41 outputs a PWM signal Spwm of an H level. Here, since the error voltage Verr is lowered when the output voltage Vout of the output part 10 increases, the PWM signal Spwm has a long period of being at the L level and has a short period of being at the H level. On the other hand, since the error voltage Verr increases when the output voltage Vout of the output part 10 is lowered, the PWM signal Spwm has a short period of being at the L level and has a long period of being at the H level. Thus, the PWM signal Spwm is a signal in which a duty ratio changes according to the output voltage Vout in a pulse signal of a prescribed cycle.

The NAND circuit 42 is inputted with the PWM signal Spwm and a stop signal Sstop to be described later from the PFM controller 60. The NAND circuit 42 conducts a NAND operation of the PWM signal Spwm and the stop signal Sstop to thereby output a signal S1. Thus, the signal S1 of the NAND circuit 42 becomes the L level when the PWM signal Spwm and the stop signal Sstop are both at the H level, and becomes the H level when at least one of the PWM signal Spwm and the stop signal Sstop is at the L level. The signal S1 of the NAND circuit 42 is inputted via the buffer circuit 43 to the gate of the switch 11 as the drive signal Sgate1 for driving the switch 11.

The current determination part 50 is for determining whether or not the current of the inductor 15 of the output part 10 has become less than or equal to a predetermined value. The current determination part 50 comprises a NAND circuit 51, a delay circuit 52 and a comparator 53.

The NAND circuit 51 is inputted with the signal S1 of the NAND circuit 42. The delay circuit 52 is inputted with the drive signal Sgate1. The delay circuit 52 outputs a signal S2 obtained by delaying the drive signal Sgate1 by a predetermined time. The signal S2 is inputted to the NAND circuit 51.

The comparator 53 has a non-inverting input terminal supplied with a voltage LX of the node N1 and an inverting input terminal connected to the ground GND. The comparator 53 compares the voltage LX and the ground GND to output a signal S3. The signal S3 is inputted to the NAND circuit 51.

The NAND circuit 51 is configured to determine whether or not the current of the inductor 15 has become less than or equal to 0 A. Here, when the current of the inductor 15 has become less than or equal to 0 A, it is a boundary between CCM and DCM. The output part 10 may be considered to be switched by the PFM method in a region where the current of the inductor 15 is in the DCM.

The NAND circuit 51 performs a NAND operation of the signals S1, S2 and S3 to thereby output a current determination signal Scurrent. When the current of the inductor 15 has become less than or equal to 0 A, the current determination signal Scurrent becomes an L level. In any other case, the current determination signal Scurrent becomes an H level.

For example, when the switch 11 is turned on with the drive signal Sgate1 being at the L level, the voltage LX approximates the input voltage Vin. Thus, the signal S3 becomes an H level regardless of the current of the inductor 15. In this case, since the signal S1 of the NAND circuit 42 being of the preceding stage of the buffer circuit 43 outputting the drive signal Sgate1 is at the L level, the current determination signal Scurrent of the NAND circuit 51 becomes the H level even if the signal S3 is at the H level. Therefore, the current determination part 50 does not determine that the current of the inductor 15 has become less than or equal to 0 A during the period in which the switch 11 is on.

Next, when. the signal S1 of the NAND circuit 42 is changed from the L to H level, the drive signal Sgate1 also becomes the H level so that the switch 11 is turned off. At this time, the voltage LX is gradually reduced, but a certain interval of time, e.g., 20 ns or so, may be required until it reaches a ground GND level. So, the delay circuit 52 delays the signal S2 by 20 ns or so. Consequently, since the signal S2 is maintained at the L level until the voltage LX becomes the GND level even if the signal S1 is changed to the H level, the current determination signal Scurrent of the NAND circuit 51 becomes the H level. Therefore, the current determination part 50 does not determine that the current of the inductor 15 has become less than or equal to 0 A for the period until the voltage LX reaches the ground GND level.

Next, when the voltage LX becomes the ground GND level so that the current of the inductor 15 is brought to less than or equal to 0 A, the diode 12 is turned off to increase the voltage LX toward the output voltage Vout. Thus, the voltage LX is increased from the ground GND level. For this reason, the signal S3 of the comparator 53 becomes the H level and the signals S1 and S2 are both at the H level, so that the current determination signal Scurrent of the NAND circuit 51 is changed to the L level. In this manner, when the switch 11 is turned off so that the voltage LX is brought to the ground GND level, and the current of the inductor 15 becomes less than or equal to 0 A, the current determination signal Scurrent of the NAND circuit 51 is brought to the L level. Therefore, the current determination part 50 is capable of reliably determining that the minimum value (bottom value) of the current of the inductor 15 has become less than or equal to 0 A.

In some embodiments, it is not easy for a circuit to determine whether or not the current of the inductor 15 is completely brought to less than or equal to 0 A. Hence, the current determination part 50 may determine whether or not the current of the inductor 15 becomes a predetermined value near 0 A.

Figure 2:
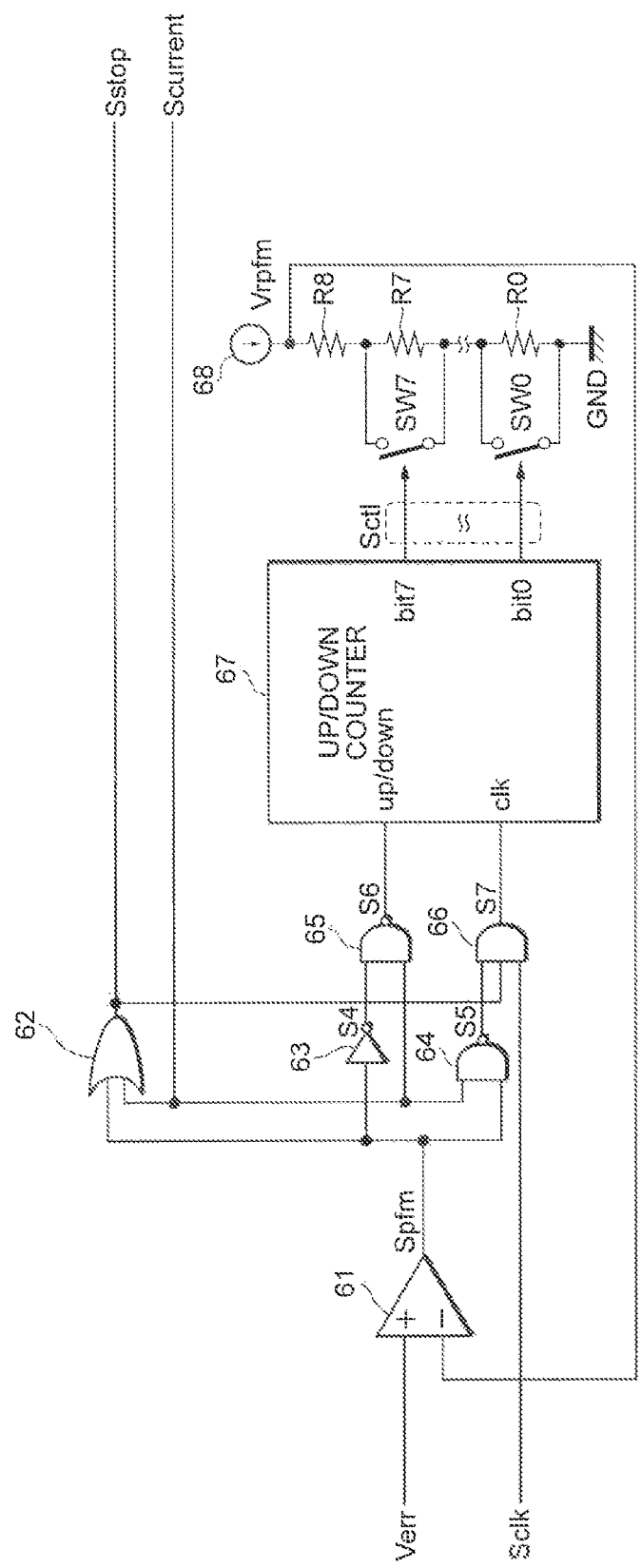
FIG. 2 is a circuit diagram illustrating a first example PFM controller, according to a first embodiment.

FIG. 2 is a circuit diagram showing a first example PFM controller 60, according to a first embodiment. The PFM controller 60 is for switching the output part 10 shown in FIG. 1 by the PFM method. As shown in FIG. 2, the PFM controller 60 comprises a comparator 61, an OR circuit 62, an inverter circuit 63, NAND circuits 64 and 65, an AND circuit 66, an UP/DOWN counter 67, switches SW0 to SW7, resistors R0 to R8, and a current source 68.

The comparator 61 has a non-inverting input terminal supplied with the voltage Verr of the amplifier 33, and an inverting input terminal supplied with a variable reference voltage Vrpfm. The comparator 61 compares the error voltage Verr and the variable reference voltage Vrpfm to output a PFM signal Spfm. Thus, when the error voltage Verr is higher than the variable reference voltage Vrpfm (Verr>Vrpfm), the PFM signal Spfm of the comparator 61 is brought to the H level, whereas when the error voltage Verr is less than or equal to the variable reference voltage Vrpfm (Verr≤Vrpfm), the PFM signal Spfm is brought to the L level.

The OR circuit 62 is for pausing the switching of the output part 10. The OR circuit 62 is configured to pause the switching of the output part 10, based on the variable reference voltage Vrpfm. Further, the OR circuit 62 is an example of a "pause controller" in some embodiments.

The OR circuit 62 is inputted with the PFM signal Spfm and the current determination signal Scurrent of the NAND circuit 51 shown in FIG. 1. The OR circuit 62 performs an OR operation of the PFM signal Spfm and the current determination signal Scurrent to thereby output the stop signal Sstop. Thus, the stop signal Sstop becomes the L level when the PFM signal Spfm and the current determination signal Scurrent are both at the L level, whereas when at least one of the PFM signal Spfm and the current determination signal Scurrent is at the H level, the stop signal Sstop becomes the H level.

As described above, the stop signal Sstop is inputted to the NAND circuit 42 shown in FIG. 1. When the stop signal Sstop is at the L level, the NAND circuit 42 becomes the H level regardless of the PWM signal Spwm, and the switch 11 is turned off. Thus, while the stop signal Sstop is at the L level, the switching of the output part 10 by the PWM signal Spwm is paused. At this time, since the pulses of the PWM signal Spwm are skipped according to the period in which the stop signal Sstop is at the L level, the cycle, i.e., frequency of the switching of the PWM method, is changed. In this manner, the OR circuit 62 outputs the stop signal Sstop, based on the variable reference voltage Vrpfm to pause the switching of the output part 10, so that the frequency of the switching of the PWM method is changed, whereby the switching of the PFM method intermittently operating the output part 10 can be realized.

The inverter circuit 63 is inputted with the PFM signal Spfm of the comparator 61. The inverter circuit 63 performs a logical NOT operation of the PFM signal Spfm to thereby output a signal S4.

The NAND circuit 64 is inputted with the PFM signal Spfm of the comparator 61 and the current determination signal Scurrent of the NAND circuit 51 shown in FIG. 1. The NAND circuit 64 performs a NAND) operation of the PFM signal Spfm and the current determination signal Scurrent to thereby output a signal S5. Thus, when the PFM signal Spfm and the current determination signal Scurrent are both at the H level, the signal S5 of the NAND circuit 64 becomes the L level, whereas when at least one of the PFM signal Spfm and the current determination signal Scurrent is at the L level, the signal S5 becomes the H level.

The NAND circuit 65 is inputted with the signal S4 of the inverter circuit 63 and the current determination signal Scurrent of the NAND circuit 51 shown in FIG. 1. The NAND circuit 65 performs a NAND operation of the signal S4 and the current determination signal Scurrent to thereby output a signal S6. Thus, when the signal S4 and the current determination signal Scurrent are both at the H level, the signal S6 of the NAND circuit 65 becomes the L level, whereas when at least one of the signal S4 and the current determination signal Scurrent is at the L level, the signal S6 becomes the level.

The AND circuit 66 is inputted with the signal S5 of the NAND circuit 64 and the stop signal Sstop of the OR circuit 62. Further, the AND circuit 66 is inputted with a clock signal Sclk of a prescribed cycle from the oscillator OSC shown in FIG. 1. The AND circuit 66 performs an AND operation of the signal S5, the stop signal Sstop and the clock signal Sclk to thereby output a signal S7. Thus, the signal S7 of the AND circuit 66 becomes the H level when the signal S5, the stop signal Sstop and the clock signal Sclk are all at the H level, i.e., the signal S5 and the stop signal Sstop are both at the H level, and at the timing of a pulse of a prescribed cycle of the clock signal Sclk. Further, when at least one of the signal S5, the stop signal Sstop and the clock signal Sclk is at the L level, the signal S7 of the AND circuit 66 becomes the L level.

The UP/DOWN counter 67 is for controlling the variable reference voltage Vrpfm. The UP/DOWN counter 67 is configured to control the variable reference voltage Vrpfm based on the result of determination by the current determination part 50, i.e., the result of comparison between the current determination signal Scurrent of the NAND circuit 51, the error voltage Verr, and the variable reference voltage Vrpfm, i.e., the PFM signal Spfm of the comparator 61. Therefore, the variable reference voltage Vrpfm taken as a reference upon pausing the switching of the output part 10 can be controlled to an appropriate value. Further, the UP/DOWN counter 67 is an example of a reference voltage controller in some embodiments.

The UP/DOWN counter 67 counts up or down an 8-bit counter from a bit 0 to a bit 7, based on the input of an up/down terminal, for example. The UP/DOWN counter 67 outputs control signals Sctl to the eight switches SW0 to SW7, based on the count values of the 8-bit counter. The eight resistors R0 to R8 are connected in series. One end of the resistor R8 is connected to the current source 68, and one end of the resistor R0 is connected to the ground GND. Further, the switches SW0 to SW7 are respectively connected in parallel to the resistors R0 to R7. The respective switches SW0 to SW7 are turned on when the control signals Sctl are inputted thereto. Therefore, since the values of the resistors between the current source 68 and the ground. GND change according to the number of the switches SW0 to SW7 each turned on by the control signal Sctl, the UP/DOWN counter 67 is capable of changing the voltage of the current source 68, i.e., the variable reference voltage Vrpfm.

The UP/DOWN counter 67 has the up/down terminal inputted with the signal S6 of the NAND circuit 65 and a clock terminal inputted with the signal S7 of the AND circuit 66. The UP/DOWN counter 67 is supplied with "7" as an initial value for a count value, for example. The UP/DOWN counter 67 counts in timing at which the signal S7 inputted to the clock terminal is at the H level. When the signal S6 inputted to the up/down terminal is at the H level, the UP/DOWN counter 67 counts down, and when the signal S6 inputted to the up/down terminal is at the L level, the UP/DOWN counter 67 counts up. Then, the UP/DOWN counter 67 changes the number of the control signals Sctl outputted according to the count value. For example, when the count value is "7", the UP/DOWN counter 67 outputs eight control signals Sctl to turn on the switches SW0 to SW7 respectively.

For simplification, the notations of bit1, bit2, bit3, bit1, bit5 and bit6, switches SW1, SW2, SW3, SW4, SVS and SW6, and resistors R1, R2, R3, R4, R5 arid R6 are omitted in FIG. 2. The UP/DOWN counter 67 is not limited to the case where it has the 8-bit counter, and embodiments support an UP/DOWN counter with an increased or decreased number of bits as desired.

Figure 3:
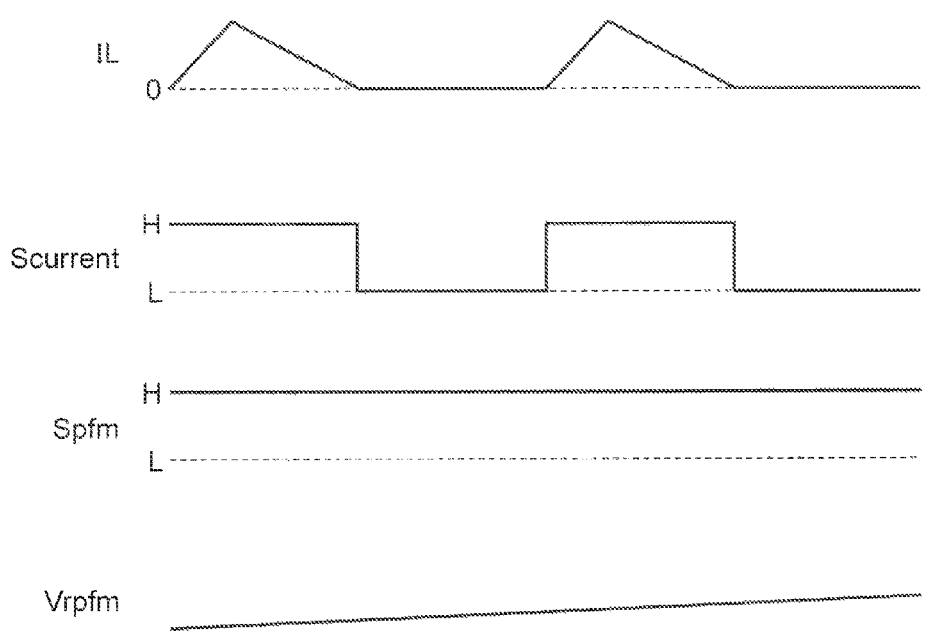
FIG. 3 is an example waveform diagram for describing operation of a control apparatus, according to a first embodiment.
Figure 4:
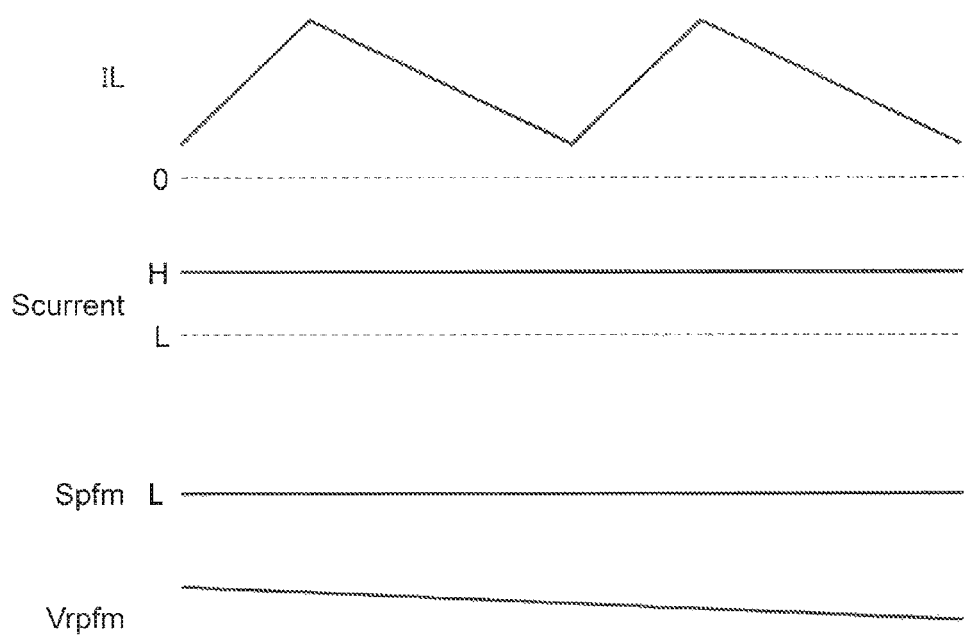
FIG. 4 is an example waveform diagram for describing operation of the control apparatus, according to a first embodiment.
Figure 5:
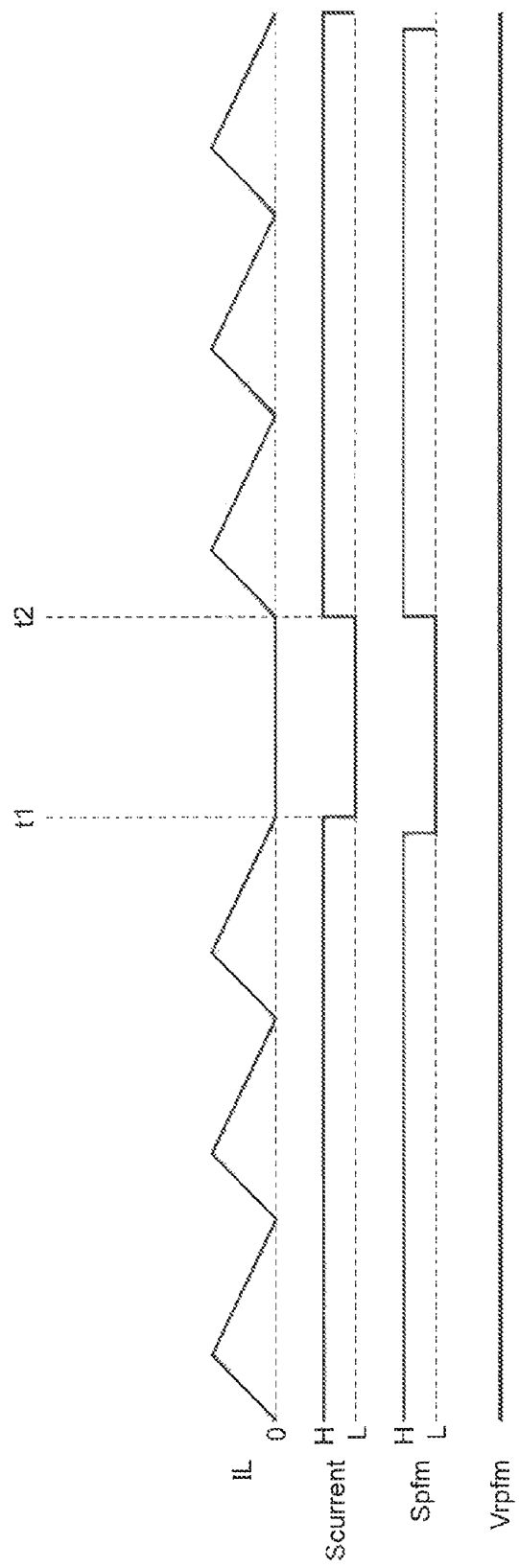
FIG. 5 is an example waveform diagram for describing operation of the control apparatus, according to a first embodiment.

FIGS. 3-5 are respective waveform diagrams flor describing the operation of the control apparatus 20 according to the first embodiment. For example, when the load connected to the output of the switching power supply 100 shown in FIG. 1 is a light load, the output voltage Vout becomes relatively high as compared with the case where the load is a middle load or a heavy load. Thus, when the variable reference voltage Vrpfm is set to a relatively low value, the PFM signal Spfm of the comparator 61 becomes an H level as shown in FIG. 3. Since the load is of the light load, the current IL of the inductor 15 becomes 0 A. The current determination signal Scurrent of the NAND circuit 51 becomes an L level. In the state in which the PFM signal Spfm is at the H level and the current determination signal Scurrent is at the L level, the value of the variable reference voltage Vrpfm is considered to be low with respect to the conditions such as the current input voltage Vin, output voltage Vout, frequency for switching, inductance of inductor 15, etc.

At this time, the up/down terminal of the UP/DOWN counter 67 is inputted with the signal S6 of the H level, and the clock terminal thereof is inputted with the signal S7 of the H level in the cycle of the clock signal Sclk. Thus, the UP/DOWN counter 67 turns off in order the switches SW0 to SW7 in the cycle of the clock signal Sclk. Therefore, when the current determination signal Scurrent is at the L level, and the PFM signal Spfm is at the H level, the UP/DOWN counter 67 is capable of increasing the variable reference voltage Vrpfm as shown in FIG. 3. Accordingly, the variable reference voltage Vrpfm can be changed to a value suitable for the conditions such as the current input voltage Vin, output voltage Vout, switching frequency, inductance of inductor 15, etc. Degradation in power conversion efficiency of the switching power supply 100 can be prevented as compared with the case where the value of the variable reference voltage Vrpfm remains low.

Likewise, when the variable reference voltage Vrpfm is set to a relatively high value where the load is of the light load, the PFM signal Spfm of the comparator 61 becomes the L level as shown in FIG. 4. Since the current IL of the inductor 15 does not reach less than or equal to 0 A, the current determination signal Scurrent of the NAND circuit 51 becomes the H level. In this manner, in the state in which the PFM signal Spfm is at the L level and the current determination signal Scurrent is at the H level, the value of the variable reference voltage Vrpfm is considered to be high with respect to the conditions such as the current input voltage Vin, output voltage Vout, switching frequency, inductance of inductor 15, etc.

At this time, the up/down terminal of the UP/DOWN counter 67 is inputted with the signal S6 of the L level, and the clock terminal thereof is inputted with the signal S7 of the H level in the cycle of the clock signal Sclk. Thus, the UP/DOWN counter 67 turns on in order the switches SW0 to SW7 in the cycle of the clock signal Sclk. Therefore, when the current determination signal Scurrent is at the H level, and the PFM signal Spfm is at the L level, the UP/DOWN counter 67 is capable of reducing the variable reference voltage Vrpfm as shown in FIG. 4. Accordingly, the variable reference voltage Vrpfm can be changed to values suitable for the conditions such as the current input voltage Vin, output voltage Vout, switching frequency, inductance of inductor 15, etc. It is possible to reduce ripple in the output voltage Vout of the switching power supply 100 as compared with the case where the variable reference voltage Vrpfm remains high.

Also, likewise, when the variable reference voltage Vrpfm. is set to an appropriate value where the load is of the light load, for example, as a result of increasing or decreasing the variable reference voltage Vrpfm as described above, the PFM signal Spfm of the comparator 61 becomes the L level as shown in FIG. 5, The current IL of the inductor 15 becomes less than or equal to 0 A at a given time, e.g., a time t1, and the current determination signal Scurrent of the NAND circuit 51 becomes the L level. In this manner, in the state in which the PFM signal Spfm is at the L level, and the current determination signal Scurrent is at the L level, the power conversion efficiency of the switching power supply 100 is considered to be low at the switching of the output part 10 by the PWM method.

At this time, the OR circuit 62 outputs the stop signal Sstop of the L level to pause the switching of the output part 10 by the PWM method. Therefore, the output part 10 is switched by the PFM method. Accordingly, the switching power supply 100 is capable of maintaining high power conversion efficiency even when the load connected to the output of the switching power supply 100 is of the light load.

Even when the clock signal Sclk of the oscillator OSC is brought to the H level in a prescribed cycle while the stop signal Sstop is at the L level, the signal S7 of the AND circuit 66 remains at the L level. Hence, the UP/DOWN counter 67 does not output the control signals Sctl for a period in which the stop signal Sstop is at the L level. Therefore, the UP/DOWN counter 67 is capable of maintaining the value of the variable reference voltage Vrpfm for a period between times t1 and t2 in FIG. 5. Accordingly, the variable reference voltage Vrpfm can be kept remained at the present value for a period during which the switching is paused.

Next, when the output voltage Vout is lowered with the pause of the switching of the output part 10, the error voltage Verr of the amplifier 33 increases. As a result, when the error voltage Verr exceeds the variable reference voltage Vrpfm at a given time, e.g., time t2, the PFM Spfm of the comparator 61 becomes from the L to H level. Thus, the stop signal Sstop of the OR circuit 62 becomes the H level so that the switching of the output part 10 is resumed to bring the current determination signal Scurrent of the NAND circuit 51 to the H level.

Further, as a result of a reduction in the output voltage Vout as shown after the time t2 in FIG. 5, the error voltage Verr is not necessarily in excess of the variable reference voltage Vrpfm.

During the pause of the switching of the output part 10, when, for example, the conditions such as the input voltage Vin, the output voltage Vout, the switching frequency, the inductance of the inductor 15, etc. are changed, and the reference voltage Vrpfm at the time t1 es a high value with respect to the changed conditions, the PFM signal Spfm of the comparator 61 may remain at the L level, unlike after the time t2 of FIG. 5, even if the error voltage Verr of the amplifier 33 is increased. At this time, if the bottom value of the current IL of the inductor 15 does not reach less than or equal to 0 A as shown in FIG. 4, for example, the current determination signal Scurrent of the NAND circuit 51 becomes the H level. In this case, as described above, the UP/DOWN counter 67 turns on in order the switches SW0 to SW7 in the cycle of the clock signal Sclk to reduce the variable reference voltage Vrpfm. Therefore, the UP/DOWN counter 67 is capable of changing the variable reference voltage Vrpfm to an appropriate value with respect to the changed conditions.

During the pause of the switching of the output part 10, when, for example, the conditions such as the input voltage Vin, the output voltage Vout, the switching frequency, the inductance of the inductor 15, etc. are changed, and the reference voltage Vrpfm at the time t1 becomes a low value with respect to the changed conditions, the error voltage Verr of the amplifier 33 is increased to exceed the variable reference voltage Vrpfm, so that the PFM signal Spfm of the comparator 61 is brought to the H level. At this time, if the current IL of the inductor 15 becomes 0 A as shown in FIG. 3, for example, the current determination signal Scurrent of the NAND circuit 51 may reach the L level, unlike after the time t2 of FIG. 5. In this case, as described above, the UP/DOWN counter 67 turns off in order the switches SW0 to SW7 in the cycle of the clock signal Sclk to increase the variable reference voltage Vrpfm. Therefore, the UP/DOWN counter 67 is capable of changing the variable reference voltage Vrpfm to an appropriate value with respect to the changed conditions.

When the load connected to the output of the switching power supply 100 is not the light load, i.e., it is the middle load or the heavy load, the output voltage Vout becorries relatively low as compared with the case where the load is of the light load. Thus, the error voltage Verr of the amplifier 33 becorries relatively high so that the PFM signal Spfm of the comparator 61 becomes the H level. Further, the current ILL of the inductor 15 does not reach less than or equal to 0 A and the current determination signal Scurrent of the NAND circuit 51 becomes the H level. At this time, the OR circuit 62 outputs the stop signal Sstop at the H level. Therefore, the output part 10 is switched by the PWM method during the period in which the load connected to the output of the switching power supply 100 is the middle load or the heavy load.

The stop signal Sstop becomes the H level, but the signal S5 of the NAND circuit 64 becomes the L level. Thus, even if the clock signal Sclk of the oscillator OSC is brought to the H level in a prescribed cycle while the PFM signal Spfm and the current determination signal Scurrent are both at the H level, the signal S7 of the AND circuit 66 remains at the L level. Hence, the UP/DOWN counter 67 does not output the control signals Sctl while the PFM signal Spfm and the current determination signal Scurrent are both at the H level. Therefore, the UP/DOWN counter 67 is capable of maintaining the value of the variable reference voltage Vrpfn during the period in which the load connected to the output of the switching power supply 100 is the middle load or the heavy load. Accordingly, the variable reference voltage Vrpfm can be kept at the current value during the period in which the load of the switching power supply 100 is the middle load or the heavy load.

The present embodiment has shown the example in which the PFM controller 60 increases, reduces or maintains the variable reference voltage Vrpfm and directly controls it, but is not limited to it. The PFM controller 60 may indirectly control the variable reference voltage Vrpfm, for example.

Figure 6:
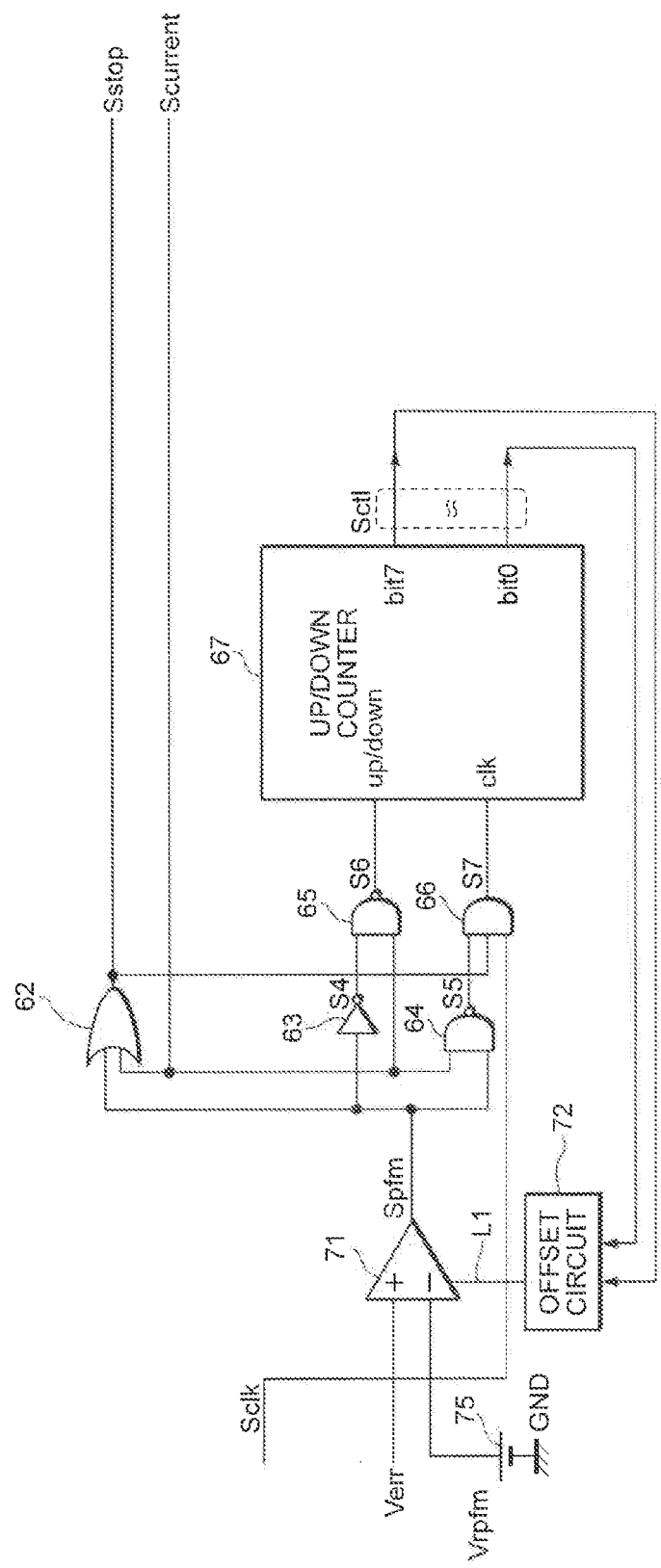
FIG. 6 is a circuit diagram illustrating a second example PFM contro according to a first embodiment.

FIG. 6 is a circuit diagram illustrating a second example PFM controller 60 in the first embodiment. As shown in FIG. 6, the PFM controller 60 comprises an OR circuit 62, an inverter circuit 63, NAND circuits 64 and 65, an AND circuit 66, and an UP/DOWN counter 67, as with the PFM controller 60 shown in FIG. 2. The PFM controller 60 also comprises a comparator 71 and an offset circuit 72 instead of the comparator 61 shown in FIG. 2. Since the OR circuit 62, the inverter circuit 63, the NAND circuits 64 and 65, the AND circuit 66, and the UP/DOWN counter 67 are identical to those in the example shown in FIG. 2, their description will be omitted.

The comparator 71 has a non-inverting input terminal supplied with the error voltage Verr of the amplifier 33 shown in FIG. 1 and an inverting input terminal supplied with a variable reference voltage Vrpfm of a voltage source 75. In the example of FIG. 6, the variable reference voltage Vrpfm is a voltage of a prescribed value, i.e., a constant voltage. Thus, the variable reference voltage Vrpfm itself is not increased or decreased. The offset circuit 72 is inputted from the UP/DOWN counter 67 with control signals Sctl equivalent to the number corresponding to the count values of a bit counter. The comparator 71 and the offset circuit 72 are connected to each other by a connecting line L1. Further, the UP/DOWN counter 67 and the offset circuit 72 may be equivalent to another example of a "reference voltage controller" according to some embodiments.

Figure 7:
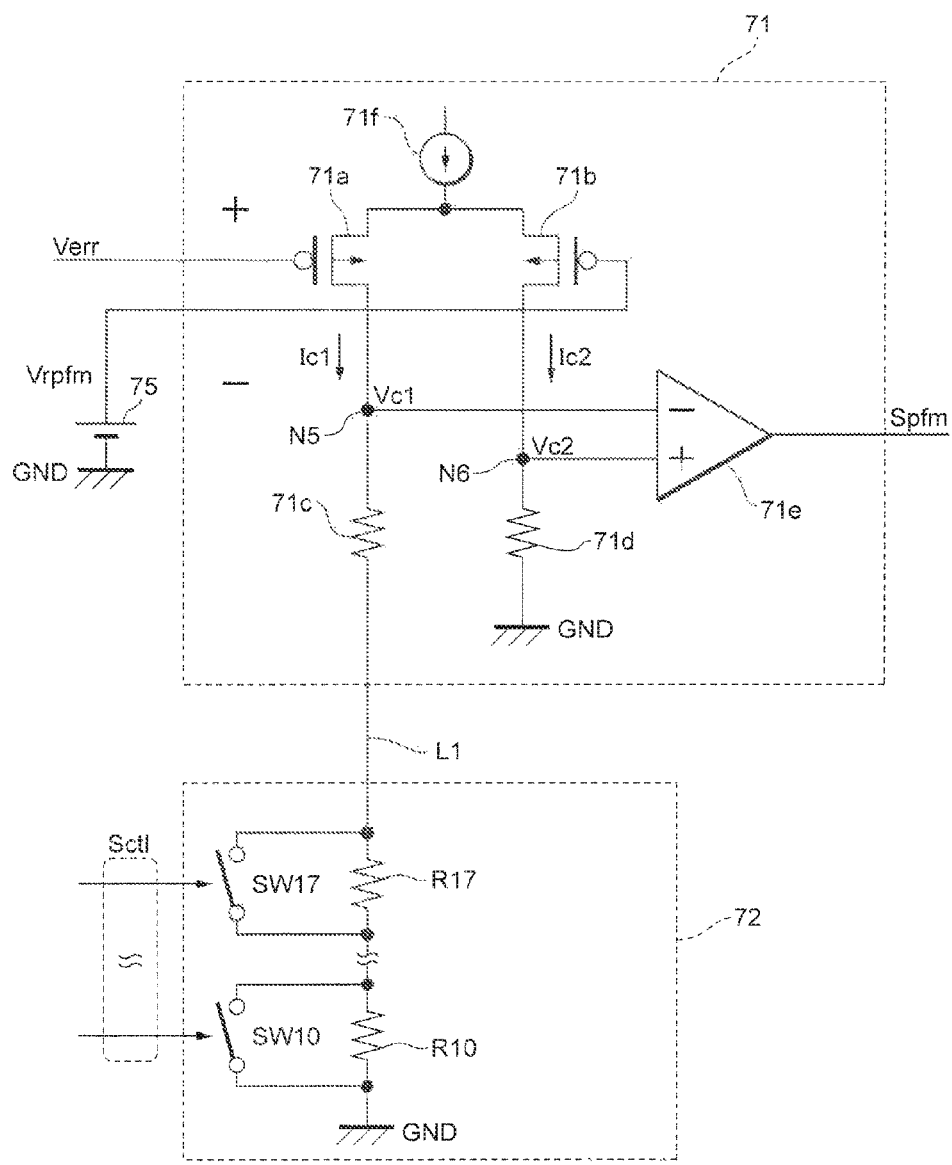
FIG. 7 is a circuit diagram illustrating an example comparator and offset circuit, according to a first embodiment.

FIG. 7 is a circuit diagram illustrating an example comparator 71 and offset circuit 72 shown in FIG. 6. As shown in FIG. 7, the comparator 71 comprises, for example, switches 71a and 71b, resistors 71c and 71d, and a sub-comparator 71e.

The switches 71a and 71b are respectively a P channel MOSFET, for example and have the same characteristics. The switches 71a and 71b respectively have sources connected to a current source 71f. The switch 71a has a drain connected to a node N5 and a gate supplied with the error voltage Verr through the non-inverting input terminal of the comparator 71. The switch 71b has a drain connected to a node N6 and a gate supplied with the variable reference voltage Vrpfm through the inverting input terminal of the comparator 71. When the switch 71a is turned on, a current Ic1 flows to the node N5 through switch 71a between the source and drain thereof from the current source 71f. When the switch element 71b is turned on, a current Ic2 flows to the node N6 through switch 71b between the source and drain thereof from the current source 71f.

The resistors 71c and 71d have, as an example, the same resistance value. The resistor 71c has one end connected to the node N5, and the other end connected to the connecting line L1. The resistor 71d has one end connected to the node N6, and the other end connected to the ground GND.

The sub-comparator 71e has an inverting input terminal supplied with a voltage Vc1 of the node N5 and a non-inverting input terminal supplied with a voltage Vc2 of the node N6. The sub-comparator 71e compares the voltage Vc2 and the voltage Vc1 with each other to output a PFM signal Spfm as with the comparator 61 shown in FIG. 2. When the voltage Vc2 is higher than the voltage Vc1 (Vc2>Vc1), the PFM signal Spfm of the sub-comparator 71e becomes an H level. When the voltage Vc2 is less than or equal to the voltage Vc1 (Vc2≤Vc1), the PFM signal Spfm becomes an L level. Thus, the PFM signal Spfm changes from the H to L level or from the L to H level with the case where the voltage Vc2 being identical to the voltage Vc1 (Vc2=Vc1) as the boundary.

The offset circuit 72 comprises eight resistors R10 to R17 and eight switches SW10 to SW17. For simplification, the notations of the switches SW11, SW12, SW13, SW14, SW15 and SW16, and the resistors R11, R12, R13, R14, R15 and R16 are omitted in FIG. 7. The resistors R10 to R17 are connected in series. On end of the resistor R17 is connected to the connecting line L1, and the other end of the resistor R10 is connected to the ground GND. The switches SW10 to SW17 are respectively connected in parallel to the resistors R10 to R17. The switches SW10 to SW17 can respectively be inputted with control signals Sctl from the UP/DOWN counter 67. When the control signals Sctl are inputted to the switches SW10 to SW17, they are turned on.

For example, since the connecting line L1 is connected to the ground GND when all the switches SW10 to SW17 are turned on by the control signals Sctl, the condition under which the voltage Vc2 becomes identical to the voltage Vc1 is when the error voltage Verr is identical to the variable reference voltage Vrpfm. (Verr=Vrpfm). In this case, the offset circuit 72 does not offset the error voltage Verr.

On the other hand, for example, when the control signals Sctl are not inputted and any of the switches SW10 to SW17 is turned off, the resistance value between the node N5 and the ground GND becomes larger than that between the node N6 and the ground GND. Thus, the condition under which the voltage Vc2 and the voltage Vc1 becomes identical changes when the current Ic1 becomes smaller than the current Ic2 (Ic1<Ic2). Here, in order to reduce the current Ic1, the gate-source voltage of the switch element 71a can be reduced. Hence, the condition under which the voltage Vc2 is identical to the voltage Vc1 indicates that the error voltage Verr is higher than the variable reference voltage Vrpfm. In this manner, the offset circuit 72 offsets the error voltage Verr while the variable reference voltage Vrpfm is kept at the constant voltage. This therefore corresponds to indirectly increasing the variable reference voltage Vrpfm.

In contrast, when any of the switches SW10 to SW17 is turned on by the control signal Sctl from its turned-off state, the offset circuit 72 decreases an offset value of the error voltage Verr while the variable reference voltage Vrpfm in is kept at the constant voltage. This therefore corresponds to indirectly reducing the variable reference voltage Vrpfm.

By indirectly controlling the variable reference voltage Vrpfm by the UP/DOWN counter 67 and the offset circuit 72 in this manner, the comparator 71 is capable of outputting the PFM signal Spfm as with the comparator 61 shown in FIG. 2, and the PFM controller 60 shown in FIG. 6 is capable of performing operation similar to the PFM controller 60 shown in FIG. 2.

Although the present embodiment has shown the voltage mode control type switching power supply that feeds back only the output voltage Vout to the input, as the example of the switching power supply 100, embodiments are not limited to voltage mode control types. For example, the switching power supply 100 may be a current mode control type.

Thus, according to the control apparatus 20, the switching power supply 100 and the control method according to the present embodiment, the switching of the output part 10 is paused based on the variable reference voltage Vrpfm. Therefore, it is possible to realize the switching of the PWM method in which the frequency of switching of the PFM method is changed and the output part 10 is intermittently operated. The variable reference voltage Vrpfm is controlled based on the current determination signal Scurrent of the NAND circuit 51 and the PFM signal Spfm of the comparator 61. Therefore, the variable reference voltage Vrpfm, taken as the reference when the switching of the output part 10 is paused, can be controlled to the appropriate value. Accordingly, even though the conditions such as the input voltage Vin, the output voltage Vout, the frequency of the switching, the inductance of the inductor 15, etc. are changed, the variable reference voltage Vrpfm is changed to the value corresponding to the changed conditions, thereby making it possible to maintain high power conversion efficiency and reduce ripple in the output voltage Vout.

Second Embodiment

Figure 8:
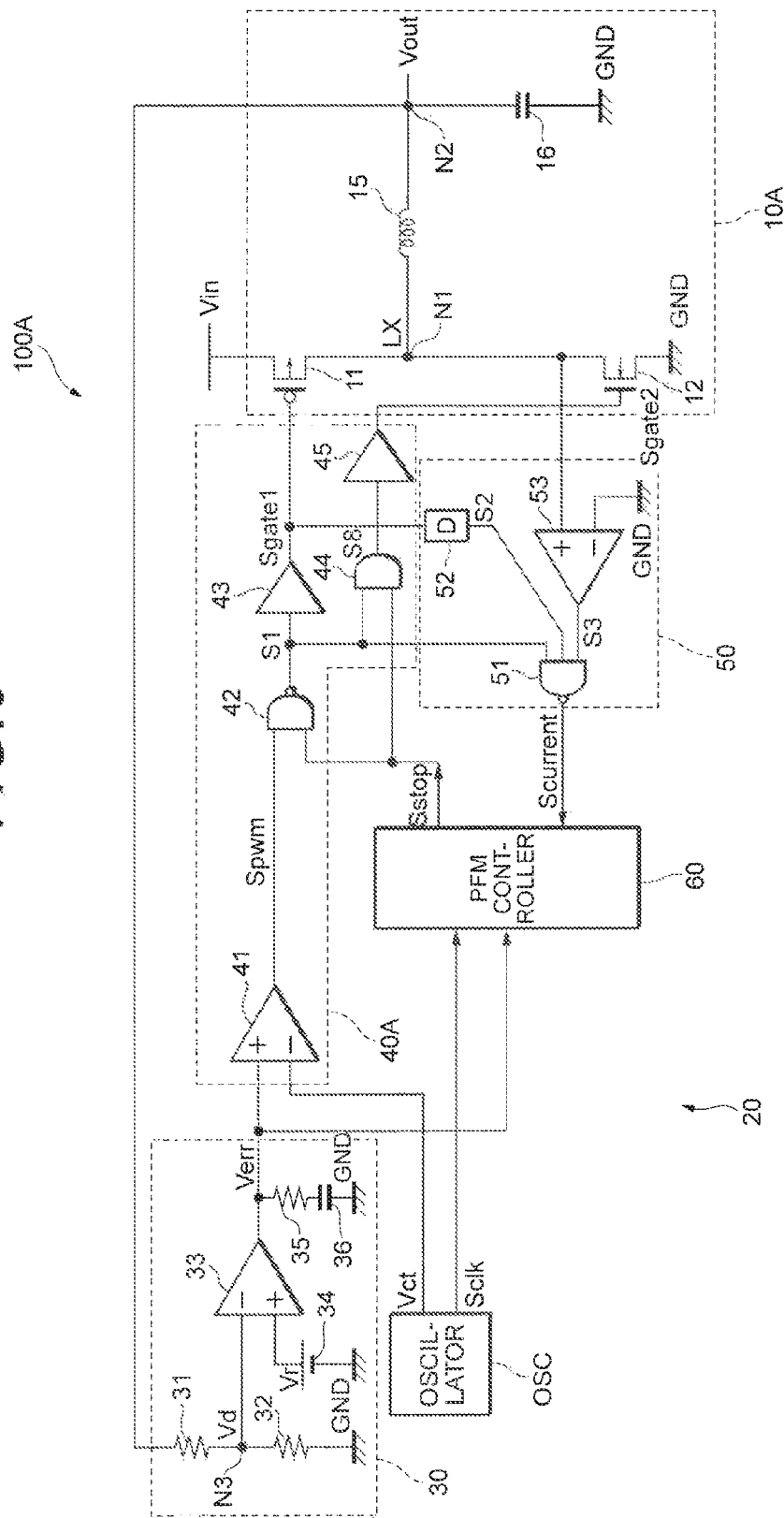
FIG. 8 is a circuit diagram illustrating an example switching power supply, according to a second embodiment.

FIG. 8 is a diagram for describing a second embodiment. Unless otherwise described, the same or similar components as those in the aforementioned first embodiment are denoted by the same reference numerals, and their description will be omitted as appropriate. Further, components and operations not illustrated in the drawing are taken to be similar to the aforementioned first embodiment.

FIG. 8 is a circuit diagram illustrating an example switching power supply 100A according to the second embodiment. The switching power supply 100A is, for example, a step-down DC-to-DC converter that reduces an input voltage Vin to generate an output voltage Vont (Vin>Vout). The switching power supply 100A according to the second embodiment is of a synchronous rectification system shown in FIG. 6, whereas the switching power supply 100 according to the first embodiment shown FIG. 1 is of the diode rectification system. Thus, the switching power supply 100A comprises an output part 10A instead of the output part 10 in the first embodiment.

A switch 12 of the output part 10A is not a diode, but an N channel MOSFET, for example. The switch 12 has a drain connected to a node N1 and a source connected to the ground GND.

A gate of the switch 12 is inputted with a drive signal Sgate2 from a control apparatus 20 in synchronization with a drive signal Sgate1. The switch 12 is driven in response to the drive signal Sgate2 to conduct switching, i.e., be turned on or off. For example, when the drive signal Sgate2 is at an H level, the switch 12 is turned on. When the drive signal Sgate2 is at an L level, the switch 12 is turned off. The drive signal Sgate2 is generated so as to be the L level when the drive signal Sgate1 is at the L level, i.e., in such a manner that the switch 12 is turned off when the switch 11 is on, and so as to be the H level when the drive signal Sgate1 is at the H level, i.e., in such a manner that the switch 12 is turned on when the switch 11 is off. By switching the switch 11 and the switch 12 in synchronization with each other in this manner, energy is stored in the inductor 15 when the switch 11 is on and the switch 12 is off, and a current flows in the inductor 15 from the ground GND when the switch 11 is off and the switch 12 is on. Thus, the output part 10A outputs an output voltage Vout smoothed by a capacitor 16.

Further, the control apparatus 20 comprises a PWM controller 40A instead of the PWM controller 40 in the first embodiment. The PWM controller 40A further comprises an AND circuit 44 and a buffer circuit 45 in addition to a comparator 41, a NAND circuit 42 and a buffer circuit 43.

The AND circuit 44 is inputted with a signal S1 of the NAND circuit 42 and a stop signal Sstop from a PFM controller 60. The AND circuit 44 performs an AND operation of the signal S1 and the stop signal Sstop to thereby output a signal S8. Thus, the signal S8 of the AND circuit 44 becomes the H level when the signal S1 and the stop signal Sstop are both at the H level. The signal S8 becomes the L level when at least one of the signal S1 and the stop signal Sstop is at the L level. The signal S8 of the AND circuit 44 is inputted via the buffer circuit 45 to the gate of the switch 12 as the drive signal Sgate2 for driving the switch 12.

A current determination part 50 is operated substantially similarly to the first embodiment.

For example, when the switch 11 is turned on and the switch 12 is turned off when the drive signal Sgate1 is at the L level, a voltage LX approximates the input voltage Vin, and hence, a signal S3 becomes the H level regardless of the current of the inductor 15. In this case, since the signal S1 of the NAND circuit 42 being of the preceding stage of the buffer circuit 43 outputting the drive signal Sgate1 is at the L level, a current determination Scurrent of a NAND circuit 51 becomes the H level even if the signal S3 is at the H level. Therefore, the current deteunination part 50 does not determine that the current of the inductor 15 has reached less than equal to 0 A during the period in which the switch 11 is on.

Next, when the signal S1 of the NAND circuit 42 is changed from the L to H level, the drive signal Sgate1 also becomes the H level, and the drive signal Sgate2 also becomes the H level. At this time, the switch 11 is turned off and the switch 12 is turned on. Thus, the voltage LX is gradually reduced, but a certain interval of time, e.g., 20 ns or so are required until it reaches a ground GND level. So, a delay circuit 52 delays a signal S2 by 20 ns or so. Consequently, since the signal S2 is maintained at the L level until the voltage LX becomes the ground GND level even if the signal S1 is changed to the H level, the current determination signal Scurrent of the NAND circuit 51 becomes the H level. Therefore, the current determination part 50 does not determine that the current of the inductor 15 has become less than or equal to 0 A for the period until the voltage LX reaches the ground GND level.

Next, when the voltage LX becomes the ground GND level so that the current of the inductor 15 is brought to less than. or equal to 0 A, the voltage LX is increased from the ground GND level due to the on resistance of the switch 12. For this reason, since the signal S3 of the comparator 53 becomes the H level and the signals S1 and S2 are both at the H level, the current determination signal Scurrent of the NAND circuit 51 is changed to the L level. In this manner, when the switch 11 is turned off and the switch 12 is turned on so that the voltage LX is brought to the ground GND level, and the current of the inductor 15 becomes less than or equal to 0 A, the current determination signal Scurrent of the NAND circuit 51 is brought to the L level for the first time. Accordingly, the current determination part 50 is capable of reliably determining that the minimum value (bottom value) of the current of the inductor 15 has become less than or equal to 0 A.

Since the configuration and operation of the PFM controller 60 are similar to the first embodiment, their description will be omitted.

Thus, according to the control apparatus 20, the switching power supply 100A and the control method according to the present embodiment, advantageous effects similar to the control apparatus 20, the switching power supply 100 and the control method according to the first embodiment can be obtained.

Third Embodiment

Figure 9:
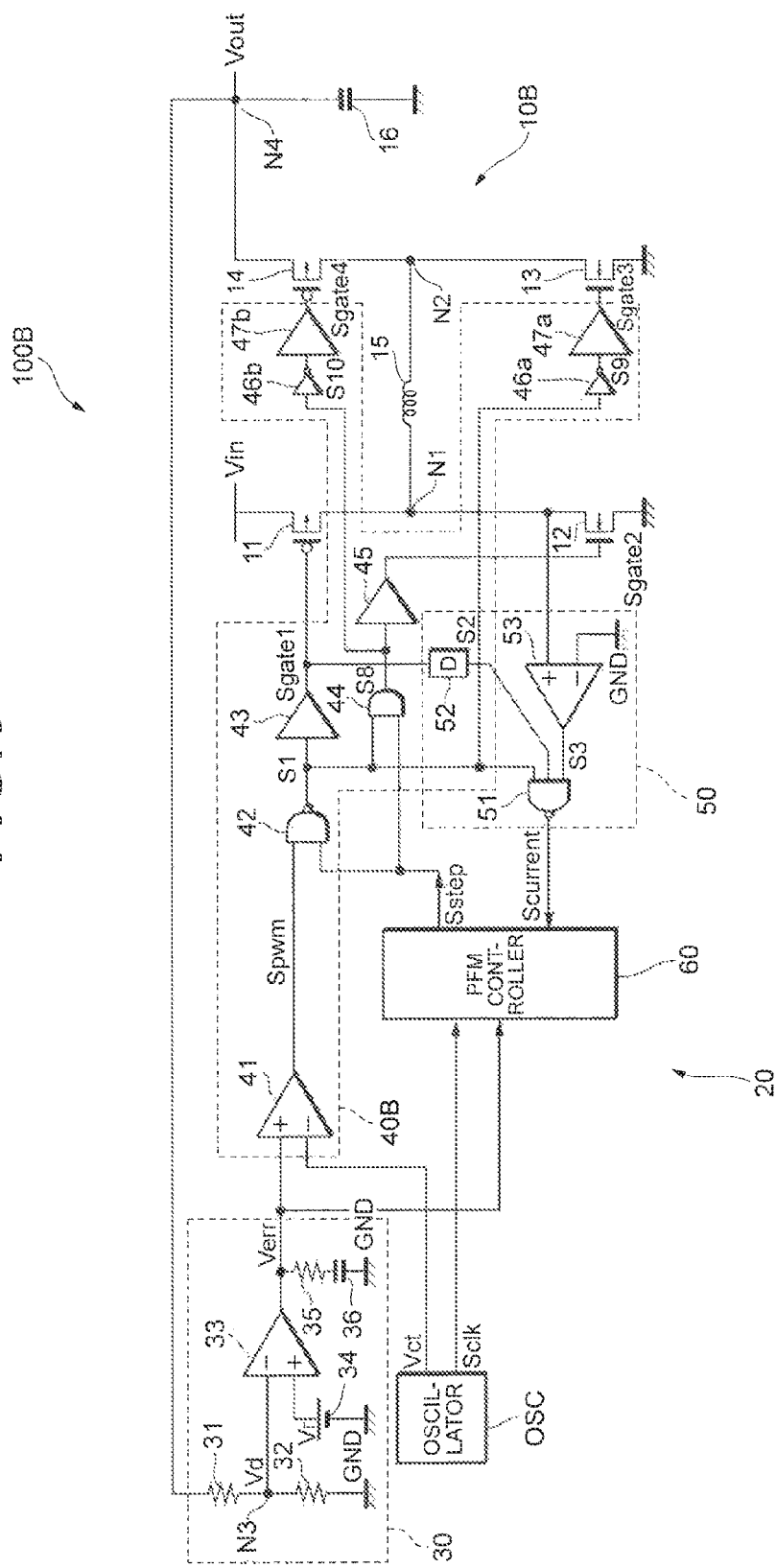
FIG. 9 is a circuit diagram illustrating an exampleswitching power supply, according to a third embodiment.

FIG. 9 is for describing a third embodiment. Unless otherwise described, the same or similar components as those in the aforementioned first embodiment are denoted by the same reference numerals, and their description will appropriately be omitted. Further, components and operations not illustrated in the drawing are taken to be similar to the aforementioned first embodiment.

FIG. 9 is a circuit diagram illustrating an example switching power supply 100B according to the third embodiment. The switching power supply 100B is, for example, a stepup/down DC-to-DC converter that steps up or down an input voltage Vin to generate an output voltage Vout. The switching power supply 100B according to the third embodiment is of a synchronous rectification system, like that shown in FIG. 9, whereas the switching power supply 100 according to the first embodiment shown in FIG. 1 is of the diode rectification system. Thus, the switching power supply 100B comprises an output part 10B instead of the output part 10 in the first embodiment.

A switch 12 of the output part 10B is not a diode but an N channel MOSFET, for example. The switch 12 has a drain connected to a node N1 and a source connected to the ground GND.

The output part 10B further comprises a switch 13 and a switch 14 in addition to a switch 11, a switch 12, a inductor 15 and a capacitor 16. The switch 13 is, for example, an N channel MOSFET and has a drain connected to a node N2 and a source connected to the ground GND. The switch 14 is, for example, a P channel MOSFET and has a drain connected to the node N2 and a source connected to a node N4. Further, the capacitor 16 has one end connected to the node N4 without connection to the node N2 and the other end connected to the ground GND.

A gate of the switch 13 is inputted with a drive signal Sgate3 from a control apparatus 20 in synchronization with a drive signal Sgate1. The switch 13 is driven in response to the drive signal Sgate3 to conduct switching, i.e., be turned on or off. For example, when the drive signal Sgate3 is at the H level, the switch 13 is turned on. When the drive signal Sgate3 is at the L level, the switch 13 is turned off. The drive signal Sgate3 is generated so as to be the H level when the drive signal Sgate1 is at the L level, i.e., in such a manner that the switch 13 is turned on when the switch 11 is on, and so as to be the L level when the drive signal Sgate1. is at the H level, i.e., in such a manner that the switch 13 is turned off when the switch 11 is off.

A gate of the switch 12 is inputted with a drive signal Sgate2 from the control apparatus 20 in synchronization with the drive signal Sgate1 and the drive signal Sgate3. The switch 12 is driven in response to the drive signal Sgate2 to conduct switching, i.e., be turned on or off. For example, when the drive signal Sgate2 is at the H level, the switch 12 is turned on. When the drive signal Sgate2 is at the L level, the switch 12 is turned off. The drive signal Sgate3 is generated so as to be the L level when the drive signal Sgate1 is at the L level and the drive signal Sgate3 is at the H level, i.e., in such a manner that the switch 12 is turned off when the switch 11 and the switch 13 are on, and so as to be the H level when the drive signal Sgate1 is at the H level and the drive signal Sgate3 is at the L level, i.e., in such a manner that the switch 12 is turned on when the switch 11 and the switch 13 are off.

A gate of the switch 14 is inputted with a drive signal Sgate4 from the control apparatus 20 in synchronization with the drive signal Sgate1, the drive signal Sgate2 and the drive signal Sgate3. The switch 14 is driven in response to the drive signal Sgate4 to conduct switching, i.e., be turned on or off. For example, when the drive signal Sgate4 is at the H level, the switch 14 is turned off. When the drive signal Sgate4 is at the L level, the switch 14 is turned on. The drive signal Sgate4 is generated so as to be the L level when the drive signal Sgate2 is at the H level, i.e., in such a manner that the switch 14 is turned on when the switch 12 is on, and. so as to be the H level when the drive signal Sgate2 is at the L level, i.e., in such a manner that the switch 14 is turned off when the switch 12 is off. By switching a set of the switch 11 and the switch 13 and a set of the switch 12 and the switch 1.4 in synchronization with each other in this manner, energy is stored in the inductor 15 when the switch 11 and the switch 13 are on and the switch 12 and the switch 14 are off, and a current flows in the inductor 15 when the switch 11 and the switch 13 are off and the switch 12 and the switch 14 are on. Thus, the output part 10B outputs an output voltage Vout smoothed by the capacitor 16.

The control apparatus 20 comprises a PWM controller 40B instead of the PWM controller 40 of the first embodiment. The PWM controller 40B further comprises an AND circuit 44, a buffer circuit 45, inverter circuits 46a and 46b, and buffer circuits 47a and 47b in addition to a comparator 41, a NAND circuit 42 and a buffer circuit 43.

The AND circuit 44 is inputted with a signal S1 of the NAND circuit 42 and a stop signal Sstop from a PFM controller 60. The AND circuit 44 performs an AND operation of the signal S1 and the stop signal Sstop to thereby output a signal S8. Thus, the signal S8 of the AND circuit 44 becomes the H level when the signal S1 and the stop signal Sstop are both at the H level. The signal S8 becomes the L level when at least one of the signal S1 and the stop signal Sstop is at the L level. The signal S8 of the AND circuit 44 is inputted via the buffer circuit 45 to the gate of the switch 12 as the drive signal Sgate2 for driving the switch 12.

The inverter circuit 46a is inputted with the signal S1 of the NAND circuit 42. The invertercircuit 46a performs a logical NOT operation of the signal S1 to thereby output a signal S9. The signal S9 of the inverter circuit 46a is inputted via the buffer circuit 47a to the gate of the switch 13 as the drive signal Sgate3 for driving the switch 13.

The inverter circuit 46b is inputted with the signal AND circuit 44. The inverter circuit 46b performs a logical NOT operation of the signal S8 to thereby output a signal S10. The signal S10 of the inverter circuit 46b is inputted via the buffer circuit 47b to the gate of the switch 14 as the drive signal Sgate4 for driving the switch 14.

A current determination part 50 is operated substantially similarly to the first embodiment.

For example, when the drive signal Sgate1 is at the L level, the drive signal Sgate3 is brought to the H level, so that the switch 11 and the switch 13 are turned on. Further, as described above, the switch 12 and the switch 14 are turned off. At this time, since a voltage LX of the node N1 approximates the input voltage Vin, a signal S3 becomes the H level regardless of the current of the inductor 15. In this case, since the signal S1 of the NAND circuit 42 being of the preceding stage of the buffer circuit 43 outputting the drive signal Sgate1 is at the L level, a current determination signal Scurrent of a NAND circuit 51 becomes the H level even if the signal S3 is at the H level. Therefore, the current of the inductor 15 is determined not to have reached less than or equal to 0 A during the period in which the switch 11 and the switch 13 are on.

Next, when the signal S1 of the NAND circuit 42 is changed from the L to H level, the drive signal Sgate1 becomes the H level, and the drive signal Sgate3 becomes the L level, so that the switch 11 and the switch 13 are turned off. Further, as described above, the switch 12 and the switch 14 are turned on. At his time, the voltage LX is gradually reduced, but a certain interval of time, e.g., 20 ns or so, are required until it reaches a ground GND level. So, a delay circuit 52 delays the signal S1 by 20 ns or so. Consequently, since the signal S2 is maintained at the L level until the voltage LX becomes the ground GND level even if the signal S1 is changed to the H level, the current determination signal Scurrent of the NAND circuit 51 becomes the H level. Therefore, the current of the inductor 15 is determined not to have reached less than or equal to 0 A for the period until the voltage LX reaches the ground GND level.

Next, when the voltage LX becomes the ground GND level so that the current of the inductor 15 reaches less than or equal to 0 A, the voltage LX is increased from the ground GND level due to the on resistance of the switch 12 and the current of the inductor 15. For this reason, since the signal S3 of a comparator 53 becomes the H level and the signals S1 and S2 are both at the H level, the current determination signal Scurrent of the NAND circuit 51 is changed to the L level. In this manner, when the switch 11 and the switch 13 are turned off so that the voltage LX is brought to the ground GND level and the current of the inductor 15 becomes less than or equal to 0 A, the current determination signal Scurrent of the NAND circuit 51 is brought to the L level for the first time. Accordingly, the current determination part 50 is capable of reliably determining that the minimum value (bottom value) of the current of the inductor 15 has become less than or equal to 0 A.

Since the configuration and operation of the PFM controller 60 are similar to the first embodiment, their description will be omitted.

Thus, according to the control apparatus 20, the switching power supply 100B and the control method according to the present embodiment, advantageous effects similar to the control apparatus 20, the switching power supply 100 and the control method according to the first embodiment can be obtained.

Fourth Embodiment

Figure 10:
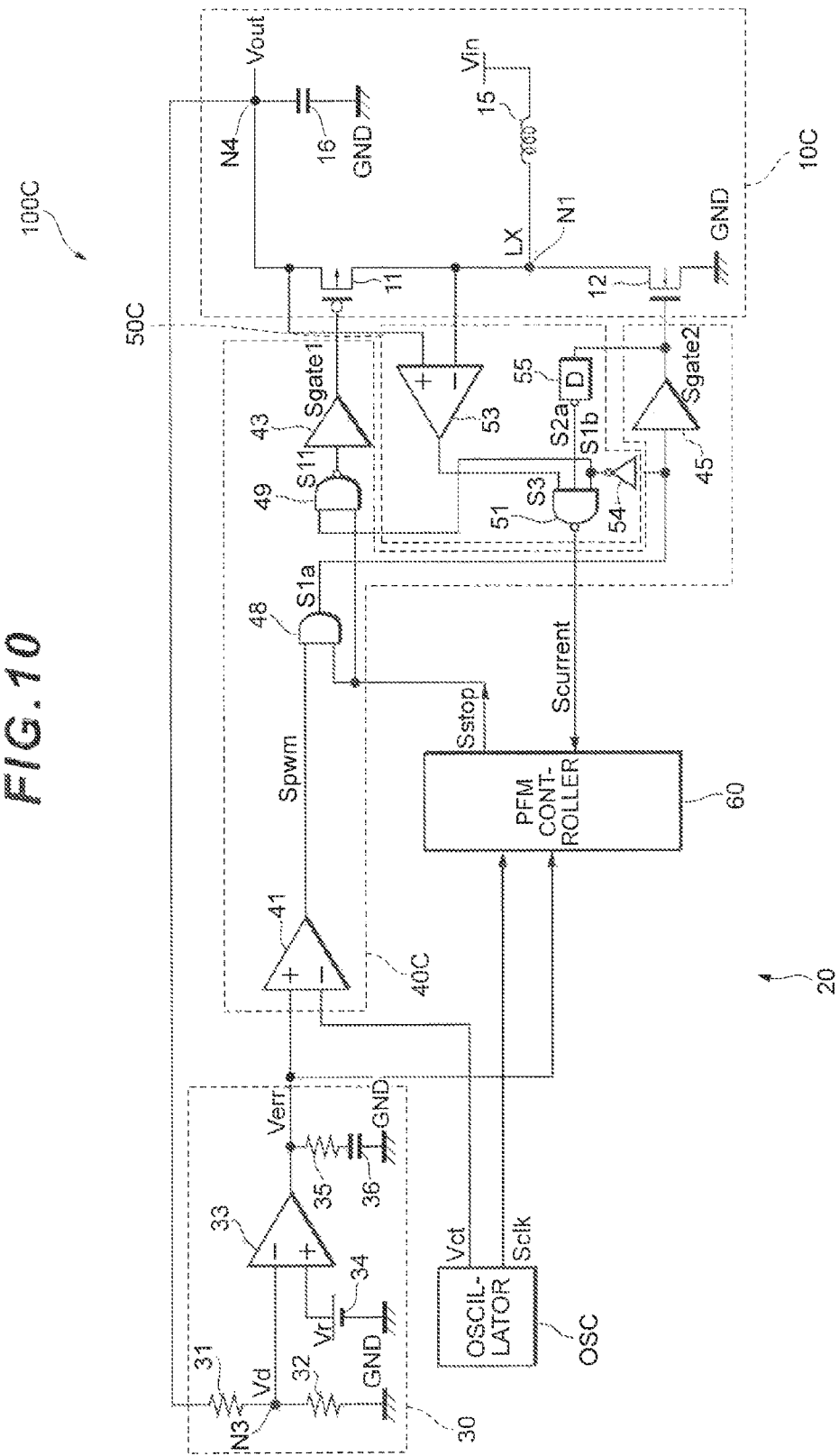
FIG. 10 is a circuit diagram illustrating an example switching power supply, according to a fourth embodiment.

FIG. 10 is a diagram for describing a fourth embodiment. Unless otherwise described, the same or similar components as those in the aforementioned first embodiment are denoted by the same reference numerals, and their description will appropriately he omitted. Further, components and operations not illustrated in the drawing are taken to be similar to the aforementioned first embodiment.

FIG. 10 is a circuit diagram illustrating an example switching power supply 100C according to the fourth embodiment. The switching power supply 100C is, for example, a step-up DC-to-DC converter that steps up an input voltage Vin to generate an output voltage Vout (Vin<Vout). The switching power supply 100C according to the fourth embodiment is of a synchronous rectification system as shown in FIG. 10, whereas the switching power supply 100 according to the first embodiment shown in FIG. 1 is of the diode rectification system. Thus, the switching power supply 100C comprises an output part 10C instead of the output part 10 in the first embodiment.

A switch 12 of the output part 1OC is not a diode but an N channel MOSFET, for example. The switch 12 has a drain connected to a node N1 and a source connected to the ground GND. Further, a switch 11 has a drain connected to the node N1 and a source connected to a node N4.

An inductor 15 has one end connected to the node N1, and the other end supplied with the input voltage Vin. A capacitor 16 has one end connected to the node N4, and the other end connected to the ground GND.

A gate of the switch 12 is inputted with a drive signal Sgate2 from a control apparatus 20. The switch 12 is driven in response to the drive signal Sgate2 to conduct switching, i.e., be turned on or off. For example, when the drive signal Sgate2 is at the H level, the switch 12 is turned on. When the drive signal Sgate2 is at the L level, the switch 12 is turned off. A gate of the switch 11 is inputted with a drive signal Sgate1 from the control apparatus 20 in sync with the drive signal Sgate2. The switch 11 is driven in response to a drive signal Sgate1 to conduct switching, i.e., be turned on or off. For example, when the drive signal Sgate1 is at the H level, the switch 11 is turned off, whereas when the drive signal Sgate1 is at the L level, the switch 11 is turned on. The drive signal Sgate1 is generated so as to be the H level when the drive signal Sgate2 is at the H level, i.e., in such a manner that the switch 11 is turned off when the switch 12 is on, and so as to be the L level when the drive signal Sgate2 is at the L level, i.e., in such a manner that the switch 11 is turned on when the switch 12 is off. By switching the switch 12 and the switch 11 in sync with each other in this manner, energy is stored in the inductor 15 when the switch 12 is on and the switch 11 is off, and a current flows in the inductor 15 from the input voltage Vin when the switch 12 is off and the switch 11 is on. Thus, the output part 10C outputs an output voltage Vout smoothed by the capacitor 16.

The control apparatus 20 comprises a PWM controller 40C instead of the PWM controller 40 of the first embodiment. The PWM controller 40C further comprises a buffer circuit 45, an AND circuit 48 and a NAND circuit 49 in addition to a comparator 41 and a buffer circuit 43.

The AND circuit 48 is inputted with a PWM signal Spwm of the comparator 41 and a stop signal Sstop from a PFM controller 60. The AND circuit 48 performs an AND operation of the PWM signal Spwm and the stop signal Sstop to thereby output a signal S1a. Thus, the signal S1b of the AND circuit 48 becomes the H level when the PWM signal Spwm and the stop signal Sstop are both at the H level. The signal S1a becomes the L level when at least one of the PWM signal Spwm and the stop signal Sstop is at the L level. The signal S1a of the AND circuit 48 is inputted via the buffer circuit 45 to the gate of the switch 12 as the drive signal Sgate2 for driving the switch 12.

The NAND circuit 49 is inputted with a signal S1b of an inverter circuit 54 to be described later, and the stop signal Sstop from the PFM controller 60. The NAND circuit 49 performs a NAND operation of the signal S1b and the stop signal Sstop to thereby output a signal S11. Thus, when the signal S1b and the stop signal Sstop are both at the H level, the signals S11 of the NAND circuit 48 becomes the L level. When at least one of the PWM signal Spwm and the stop signal Sstop is at the L level, the signal S11 becomes the H level. The signal S11 of the NAND circuit 49 is inputted via the buffer circuit 43 to the gate of the switch 11 as the drive signal Sgate1 for driving the switch 11.

Further, the control apparatus 20 comprises a current determination part 50C instead of the current determination part 50 of the first embodiment. The current determination part 50C comprises the inverter circuit 54 and an inverting delay circuit 55 in addition to a NAND circuit 51 and a comparator 53.

The inverter circuit 54 is inputted with the signal S1a of the AND circuit 48. The inverter circuit 54 performs a logical NOT operation of the signal S1a to thereby output a signal S1b.

The inverting delay circuit 55 is inputted with the drive signal Sgate2. The inverting delay circuit 55 performs a logical NOT operation of the drive signal Sgate2 to thereby output a signal S2a delayed by a prescribed time.

The comparator 53 has a non-inverting input terminal supplied with the output voltage Vout of the node N4 and an inverting input terminal supplied with a voltage LX of the node N1. The comparator 53 compares the output voltage Vout and the voltage LX to output a signal S3. Thus, when the output voltage Vout is higher than the voltage LX (Vout>LX), the signal S3 of the comparator 53 becomes the H level. When the output voltage Vout is less than or equal to the voltage LX (Vout>LX), the signal S3 becomes the L level.

The NAND circuit 51 is inputted with the signal S1b of the inverter circuit 54, the signal S2a of the inverting delay circuit 55, and the signal S3 of the comparator 53. The NAND circuit 51 performs a NAND operation of the signal S1b, the signal S2a and the signal S3 to thereby output a current determination signal Scurrent. When the current of the inductor 15 becomes less than or equal to 0 A, the current determination signal Scurrent becomes the L level. In any other case, the current determination signal Scurrent becomes the H level.

The current determination part 50C is operated substantially similarly to the current determination part 50 in the first embodiment.

For example, when the drive signal Sgate2 is at the H level, the switch 12 is turned on. Further, as described above, the switch 11 is turned off. At this time, since the voltage LX of the node N1 approximates the ground GND, the signal S3 becomes the H level regardless of the current of the inductor 15. In this case, since the signal S1a of the AND circuit 48 being of the preceding stage of the buffer circuit 45 outputting the drive signal Sgate2 is at the H level, and the signal S1b of the inverter circuit 54 is at the L level, the current determination signal Scurrent of the NAND circuit 51 becomes the H level even if the signal S3 is at the H level. Therefore, the current of the inductor 15 is determined not to have reached less than or equal to 0 A during the period in which the switch 12 is on and the switch 11 is off.

Next, when the signal S1a of the AND circuit 48 is changed from the H to L level, the drive signal Sgate2 becomes the L level, so that the switch 12 is turned off. Further, as described above, the switch 11 is turned on. At this time, the voltage LX gradually increases, but a certain interval of time, e.g., 20 ns or so, is required until voltage LX reaches the level of the output voltage Vout. So, the inverting delay circuit 55 delays the signal S2a by 20 ns or so. Consequently, since the signal S2a is maintained at the L level until the voltage LX becomes the level of the output voltage Vout even if the signal S1a is changed to the L level, and the signal S1b of the inverter circuit 54 is changed to the H level, the current determination signal Scurrent of the NAND circuit 51 becomes the H level. Therefore, the current of the inductor 15 is determined not to have reached less than or equal to 0 A for the period until the voltage LX reaches the level of the output voltage Vout.

Next, when the voltage LX becomes the level of the output voltage Vout so that the current of the inductor 15 is brought to less than or equal to 0 A, the voltage LX is reduced from the level of the output voltage Vout due to the on resistance of the switch 11. For this reason, since the signal S3 of the comparator 53 becomes the H level and the signals S1b and S2a are both at the H level, the current determination signal Scurrent of the NAND circuit 51 is changed to the L level. In this manner, when the switch 12 is turned off and the switch 11 is turned on so that the voltage LX is brought to the level of the output voltage Vout and the current of the inductor 15 becomes less than or equal to 0 A, the current determination signal Scurrent of the NAND circuit 51 is brought to the L level for the first time. Accordingly, the current determination part 50C is capable of reliably determining that the minimum value (bottom value) of the current of the inductor 15 has become less than or equal to 0 A.

Further, the configuration and operation of the PFM controller 60 is similar to the first embodiment, and their description will therefore be omitted.

Thus, according to the control apparatus 20, the switching power supply 100C and the control method according to the present embodiment, advantageous effects similar to the control apparatus 20, the switching power supply 100 and the control method according to the first embodiment can be obtained.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for controlling a variable reference voltage of a switch mode power supply, comprising:
   receiving, by a variable reference voltage controller, a current determination signal which is based on an inductor current, a voltage differential signal which is based on an output voltage, and a variable reference voltage;
   adjusting, by the variable reference voltage controller, the variable reference voltage based on the current determination signal and the voltage differential signal; and
   transmitting, by the variable reference voltage controller, the variable reference voltage.

2. The method of claim 1, wherein the current determination signal has a first level and a second level.

3. The method of claim 2, wherein the current determination signal has the first level when the inductor current is less than or equal to a pre-determined current level.

4. The method of claim 3, wherein the predetermined current level is 0 A.

5. The method of claim 2, wherein adjusting the variable reference voltage comprises:
   increasing the variable reference voltage when the current determination signal has the first level and the voltage differential signal is greater than the variable reference voltage;

decreasing the variable reference voltage when the current determination signal has the second level and the voltage differential signal is less than or equal to the variable reference voltage;

maintaining the variable reference voltage when the current determination signal has the first level and the voltage differential signal is less than or equal to the variable reference voltage; and maintaining the variable reference voltage when current determination signal has the second level and the voltage differential signal is greater than the variable reference voltage.

6. The method of claim 1, further comprising:
receiving, by a switch, a drive signal wherein receiving a first drive level of the drive signal turns the switch on and receiving a second drive level of the drive signal turns the switch off;
receiving, by a switching controller, the current determination signal, the voltage differential signal, and the variable reference voltage;
transmitting, by the switching controller, a switch control signal which is based on the current determination signal, the voltage differential signal, and the variable reference voltage, wherein the switch control signal has a first switch control level and a second switch control level; and
receiving, by the switch, the switch control signal wherein receiving the first switch control level overrides the drive signal and turns the switch off.

7. The method of claim 6, wherein:
turning the switch on and off causes a ripple in the output voltage.

8. The method of claim 7, wherein:
overriding the switch reduces the ripple in the output voltage.

9. A method for controlling a switch-mode power supply comprising:
receiving, by a switch, a drive signal wherein receiving a first level of the drive signal turns the switch on and receiving a second level of the drive signal turns the switch off;
receiving, by a switching controller, a current determination signal which is based on an inductor current, a voltage differential signal which is based on an output voltage, and a variable reference voltage;
transmitting, by the switching controller, a switch control signal based on the current determination signal, the voltage differential signal, and the variable reference voltage, wherein the switch control signal has a first switch control level and a second switch control level;
receiving, by the switch, the switch control signal wherein receiving the first switch control level overrides the drive signal and turns the switch off;
receiving, by a reference voltage controller, the current determination signal, the voltage differential signal, and the variable reference voltage; and
adjusting, by the reference voltage controller, the variable reference voltage based on the current determination signal and the voltage differential signal.

10. The method of claim 9, wherein the current determination signal has a first level and a second level.

11. The method of claim 10, wherein the current determination signal has the first level when the inductor current is less than or equal to a pre-determined current level.

12. The method of claim 11, wherein the pre-determined current level is 0 A.

13. The method of claim 10, further comprising:
transmitting, by the reference voltage controller, the variable reference voltage.

14. The method of claim 13, wherein adjusting the variable reference voltage comprises:
increasing the variable reference voltage when the current determination signal has the first level and the voltage differential signal is greater than the variable reference voltage;
decreasing the variable reference voltage when the current determination signal has the second level and the voltage differential signal is less than or equal to the variable reference voltage;
maintaining the variable reference voltage when the current determination signal has the first level and the voltage differential signal is less than or equal to the variable reference voltage; and
maintaining the variable reference voltage when the current determination signal has the second level and the voltage differential signal is greater than the variable reference voltage.

15. An apparatus for controlling a switch-mode power supply comprising:
a switching controller which outputs a switch control signal based on:
a current determination signal which is based on an inductor current and which has a first level and a second level,
a voltage differential signal which is based on an output voltage, and
a variable reference voltage;
wherein the switch control signal has a first switch control level and a second switch control level;
a switch which receives a drive signal comprising a first drive level and a second drive level, wherein receiving the first drive level turns the switch on and receiving the second drive level turns the switch off, and which receives the switch control signal, wherein receiving the first switch control level overrides the drive signal and turns the switch off;
a reference voltage controller which adjusts the variable reference voltage based on the current determination signal and the voltage differential signal.

16. The apparatus of claim 15, wherein the current determination signal has the first level when the inductor current is less than or equal to a pre-determined current level.

17. The apparatus of claim 16, wherein the predetermined current level is 0 A.

18. The apparatus of claim 15, wherein to adjust the variable reference voltage, the reference voltage controller:
increases the variable reference voltage when the current determination signal has the first level and the voltage differential signal is greater than the variable reference voltage;
decreases the variable reference voltage when the current determination signal has the second level and the voltage differential signal is less than or equal to the variable reference voltage;
maintains the variable reference voltage when the current determination signal has the first level and the voltage differential signal is less than or equal to the variable reference voltage; and
maintains the variable reference voltage when current determination signal has the second level and the voltage differential signal is greater than the variable reference voltage.

19. The apparatus of claim 15, wherein:
turning the switch on and off causes a ripple in the output voltage.

20. The apparatus of claim 19, wherein:
overriding the switch reduces the ripple in the output voltage.

* * * * *